US006467570B1

(12) United States Patent
Herold

(10) Patent No.: US 6,467,570 B1
(45) Date of Patent: Oct. 22, 2002

(54) SPARK ARRESTER WITH SPARK FILTER

(75) Inventor: Andrew J. Herold, Bloomington, IN (US)

(73) Assignee: Arvin Technologies, Inc., Troy, MI (US)

( * ) Notice: Subject to any disclaimer, the term of this patent is extended or adjusted under 35 U.S.C. 154(b) by 0 days.

(21) Appl. No.: 09/855,983

(22) Filed: May 15, 2001

(51) Int. Cl.[7] .................................................. F01N 3/02
(52) U.S. Cl. ........................ 181/231; 181/212; 181/249; 181/250; 181/251; 181/253; 181/255; 181/257; 181/258; 181/266; 181/267; 181/268; 181/269; 181/272; 181/273; 181/275; 181/276
(58) Field of Search ................................. 181/231, 212, 181/214, 222, 249–253, 255–258, 266–270, 272–273, 275, 276

(56) References Cited

U.S. PATENT DOCUMENTS

| | | |
|---|---|---|
| 2,109,220 A | 2/1938 | Noblitt et al. |
| 2,125,449 A | 8/1938 | Kingsley |
| 2,182,204 A | 12/1939 | Hector |
| 2,600,262 A | 6/1952 | Powers |
| 2,806,548 A | 9/1957 | Carroll |
| 2,975,586 A | 3/1961 | Bray |
| 3,061,416 A * | 10/1962 | Kazokas .................... 422/176 |
| 3,082,841 A | 3/1963 | Powers |
| 3,389,764 A | 6/1968 | Kelso |
| 3,545,179 A | 12/1970 | Nelson et al. |
| 3,675,398 A | 7/1972 | Giarrizzo |
| 3,687,225 A | 8/1972 | Nelson |
| 3,688,476 A | 9/1972 | Lenane |
| 3,754,620 A | 8/1973 | Foster et al. |
| 3,884,655 A | 5/1975 | Coop |
| 4,011,922 A | 3/1977 | Goplen |
| 4,147,230 A | 4/1979 | Ormond et al. |
| 4,220,219 A | 9/1980 | Flugger |
| 4,315,559 A | 2/1982 | Casey |
| 4,450,932 A | 5/1984 | Khosropour et al. |
| 4,645,521 A | 2/1987 | Freesh |
| 4,841,728 A | 6/1989 | Jean et al. |
| 4,848,513 A * | 7/1989 | Csaszar ...................... 181/265 |
| 4,872,528 A | 10/1989 | Goplen et al. |
| 4,930,597 A | 6/1990 | Udell |
| 5,227,593 A | 7/1993 | Takahashi et al. |
| 5,246,472 A | 9/1993 | Herman et al. |
| 5,801,344 A | 9/1998 | Herold |

* cited by examiner

*Primary Examiner*—Shih-Yung Hsieh
(74) *Attorney, Agent, or Firm*—Barnes & Thornburg

(57) ABSTRACT

An exhaust processor includes a housing formed to include an interior region and a partition or first spark arrester that partitions the interior region into chambers and includes a wool filter formed to include an opening. The wool filter is positioned to filter unburned carbon particles from combustion product generated by a vehicle engine. The exhaust processor further includes an outer conduit that extends through the opening formed in the wool filter and is formed to include a passage and an inner conduit that extends into the passage and is formed to include an opening through which unburned carbon particles flow from inside the inner conduit to impinge against the outer conduit so that the outer and inner conduits operate as a second spark arrester.

20 Claims, 2 Drawing Sheets

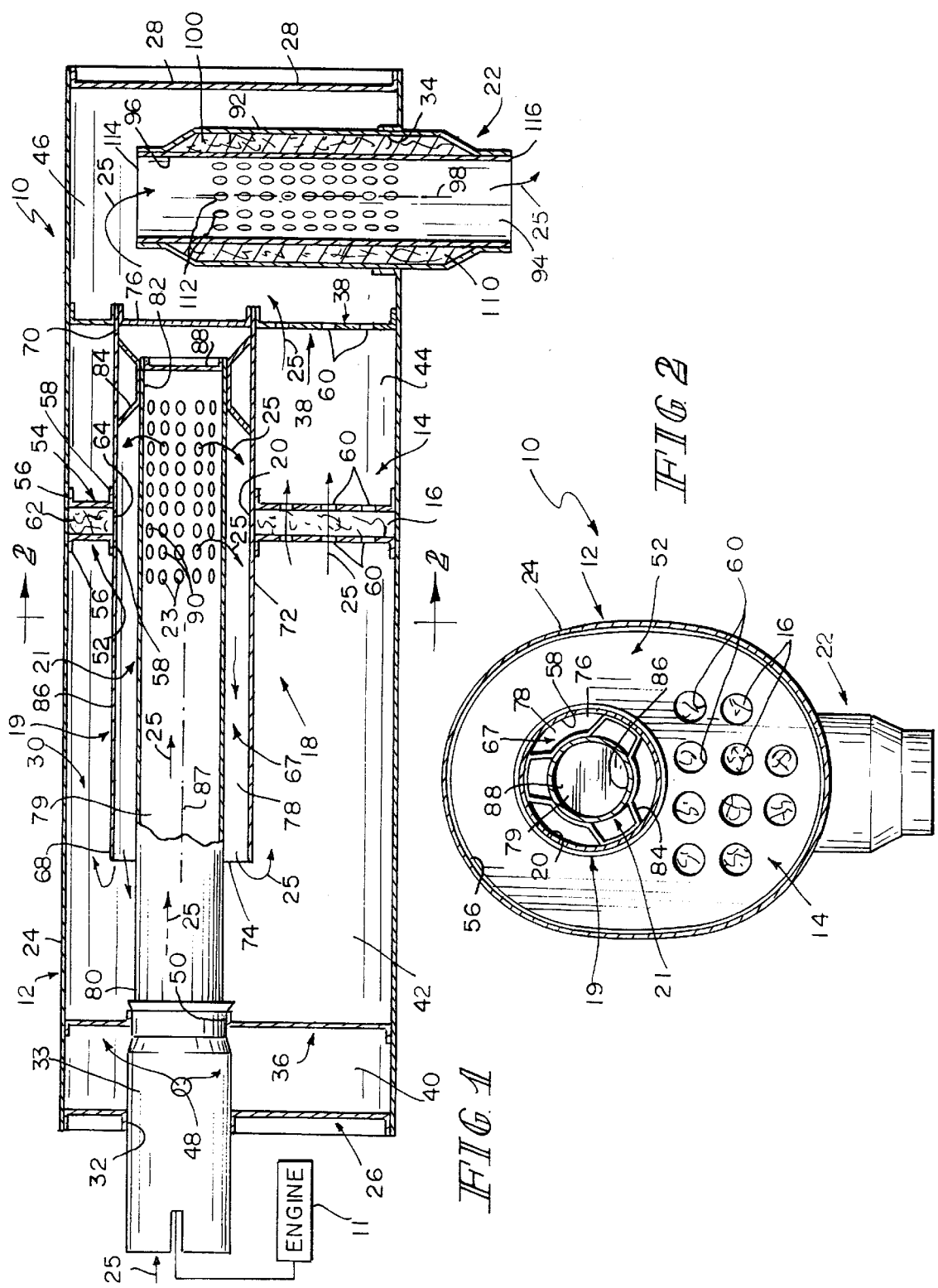

SPARK ARRESTER WITH SPARK FILTER

BACKGROUND AND SUMMARY OF THE INVENTION

The present invention relates to an exhaust processor, and particularly to an apparatus for processing combustion product generated by a vehicle engine. More particularly, the present invention relates to an exhaust processor that operates as a spark arrester and a sound attenuator.

Spark arresters are designed to prevent sparks or hot, unburned carbon particles generated by the process of combustion in an engine of a vehicle from being discharged from the vehicle. (For purposes of this specification including the claims, "unburned" means not completely burned so that partially burned is included within the meaning of "unburned.") Such carbon particles could possibly ignite when exposed to a sufficient amount of oxygen typically available in the surrounding atmosphere, thereby risking ignition of other substances which may contact the carbon particles. Off-road vehicles, such all-terrain vehicles, are especially sensitive to this risk and typically employ some type of spark arrester to minimize the possibility of causing unintended fires in their wake.

According to the present disclosure, an exhaust processor on board a vehicle includes a housing formed to include an interior region, a partition or first spark arrester, and a second spark arrester. The partition is positioned to partition the interior region into chambers and includes a pair of plates that form a space therebetween and a wool filter positioned to lie in the space between the pair of plates and formed to include an opening. The wool filter is positioned to filter unburned carbon particles from combustion product generated by an engine of the vehicle.

The second spark arrester includes an outer conduit that extends through the opening formed in the wool filter and is formed to include a first passage and an outlet. The second spark arrester further includes an inner conduit that extends into the first passage and is formed to include a second passage and an opening. Unburned carbon particles entrained in combustion product flow from the second passage through the opening formed in the inner conduit to impinge against the outer conduit to minimize the potential that the unburned carbon particles will ignite when they are discharged from the vehicle. The outer conduit is arranged to dispense combustion product through its outlet into one of the chambers without introducing combustion product directly from the first passage into the space between the first and second plates.

In preferred embodiments, the exhaust processor further includes a silencer that attenuates sound energy generated by the combustion process in the vehicle engine. The silencer is coupled to a side wall of the housing and defines an axis that is generally perpendicular to an axis defined by the inner conduit.

Additional features of the present invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is a sectional view of an exhaust processor including a housing formed to include an interior region, a first spark arrester or intermediate partition partitioning the interior region and including a wool filter configured to filter unburned carbon particles entrained in combustion product and formed to include an opening, a second spark arrester including an outer conduit extending through the opening formed in the intermediate partition and an inner conduit formed to include a field of openings through which unburned carbon particles entrained in combustion product flows to impinge against the outer conduit to reduce the ignition potential of the unburned carbon particles, and a silencer mounted to a side wall of the housing to attenuate sound;

FIG. 2 is a sectional view taken along line 2—2 of FIG. 1; and

DETAILED DESCRIPTION OF THE DRAWINGS

Figure 3:
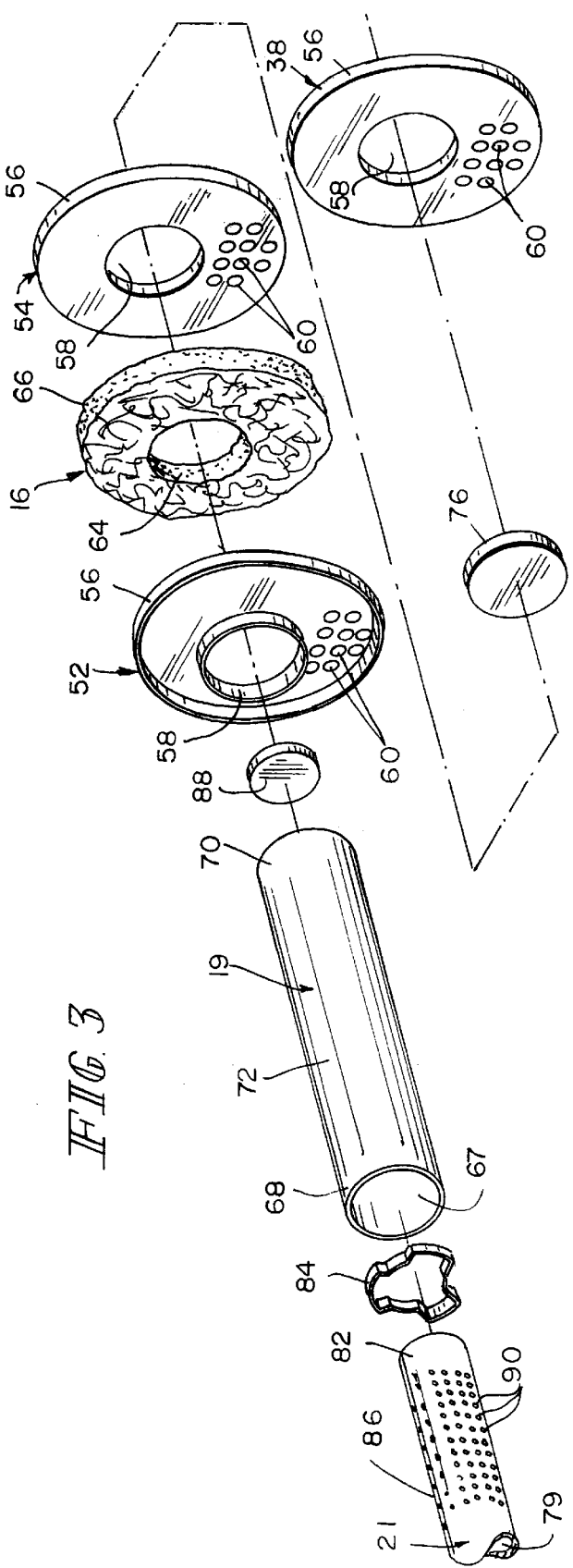
FIG. 3 is an exploded perspective view of the intermediate partition and the outer and inner conduits of FIG. 1.

An exhaust processor 10 is configured to operate as a spark arrester and a sound attenuator, as shown, for example, in FIG. 1. Exhaust processor 10 processes exhaust or combustion product generated by an engine 11 of a vehicle (not shown) to minimize the potential that hot, unburned carbon particles entrained in the combustion product will ignite when they are discharged from the vehicle. Exhaust processor 10 minimizes this ignition potential by filtering unburned carbon particles from the flow of combustion product and causing unburned carbon particles to impinge against a surface, as is discussed in more detail below. Exhaust processor 10 also attenuates sound energy induced by engine 11 during combustion.

Exhaust processor 10 includes a housing 12, a first spark arrester or intermediate partition 14, a second spark arrester 18, and a silencer 22, as shown, for example, in FIG. 1. Exhaust processor 10 is arranged so that combustion product flows in sequence through second spark arrester 18, intermediate partition 14, and silencer 22 as indicated by arrows 25. Intermediate partition 14 includes a wool filter 16 configured to filter unburned carbon particles entrained in combustion product flowing through wool filter 16. Second spark arrester 18 includes an outer conduit 19 extending through an opening 20 formed in intermediate partition 14 and an inner conduit 21 formed to include openings 23 through which unburned carbon particles entrained in combustion product flows to impinge against outer conduit 19.

Housing 12 includes a side wall 24, a left end cap 26, and a right end cap 28, as shown, for example, in FIG. 1. Side wall 24 and left and right end caps 26, 28 cooperate to define an interior region 30. Left end cap 26 is formed to include a housing inlet 32 through which combustion product enters interior region 30 via an inlet conduit 33. Side wall 24 is formed to include a housing outlet 34 through which combustion product exits interior region 30. Side wall 24 is oval-shaped, as shown, for example, in FIG. 2.

Exhaust processor 10 further includes a left plate or partition 36 and a right plate or partition 38. Partitions 14, 36, 38 and end caps 26, 28 cooperate with one another to partition interior region 30 into a volume resonator or Helmholtz chamber 40 between left end cap 26 and left partition 36, an inlet chamber 42 between left partition 36 and intermediate partition 14, an intermediate chamber 44 between intermediate partition 14 and right partition 38, and an outlet chamber 46 between right partition 38 and right end cap 28.

Inlet conduit 33 is formed to include an opening 48 in fluid communication with Helmholtz chamber 40, as shown, for example, in FIG. 1. Inlet conduit 33 is mounted to left end cap 26 and left partition 36 so as to extend through housing inlet 32 and an opening 50 formed in left partition 36.

Intermediate partition 14 further includes a first intermediate plate 52 and a second intermediate plate 54. Plates 52, 54, 38 are substantially similar in structure to one another, as shown, for example, in FIGS. 1 and 3, so only the structure of plate 52 is described and identical reference characters refer to corresponding parts. Plate 52 includes an oval-shaped edge 56 mounted to housing side wall 24. Plate 52 is formed to include a larger opening 58 sized to receive outer conduit 19 and smaller openings 60 through which combustion product flows.

Other patterns formed in plates 38, 52, 54 to permit combustion product to flow therethrough are within the scope of this disclosure. For example, each opening 60 may be larger or smaller in diameter than what is shown in FIGS. 1–3. Openings 60 may be arranged in a pattern different from what is shown in FIGS. 1–3. Plates 38, 52, 54 may include louvers.

Wool filter 16 is configured to filter unburned carbon particles entrained in combustion product flowing from inlet chamber 42 through smaller openings 60 formed in first and second intermediate plates 52, 54 and wool filter 16 to intermediate chamber 44. Wool filter 16 is positioned to lie in a space 62 between first and second intermediate plates 52, 54 and contacts first and second intermediate plates 52, 54, as shown, for example, in FIG. 1. Wool filter 16 includes an opening 64 sized to receive outer conduit 19 and an oval-shaped edge 66 contacting housing side wall 24. Opening 64 of wool filter 16 and larger openings 58 of first and second intermediate plates 52, 54 cooperate to define opening 20 of intermediate partition 14. In preferred embodiments, wool filter 16 is a pad of stainless steel wool.

Outer conduit 19 is formed to include a first passage 67 into which inner conduit 21 extends, as shown, for example, in FIGS. 1 and 2. Outer conduit 19 includes a left end 68 positioned to lie in inlet chamber 42 and a right end 70 mounted to right partition 38 in larger opening 58 of right partition 38. Outer conduit 19 further includes a side wall 72 that is mounted to first and second intermediate plates 52, 54 and extends between left and right ends 68, 70 and through larger openings 58 formed in first and second intermediate plates 52, 54 and opening 64 formed in wool filter 16.

Right end 70 is closed by a first closure cap 76 coupled to right end 70. Left end 68 is formed to include an outlet 74 through which combustion product is dispensed from an annular passage 78 formed between outer conduit 19 and inner conduit 21 into inlet chamber 42 without introducing combustion product directly from annular passage 78 into space 62 formed between first and second intermediate plates 52, 54.

Inner conduit 21 is formed to include a second passage 79 and includes a left end 80 coupled to inlet conduit 33, a right end 82 positioned to lie adjacent to right end 70 of outer conduit 19 and mounted to outer conduit 19 in first passage 67 by a mount 84, and a side wall 86 extending from left end 80 to right end 82 and defining a first central longitudinal axis 87. Right end 82 is closed by a second closure cap 88. Side wall 86 is formed to include a field of openings 90 through which unburned carbon particles entrained in combustion product flows radially outwardly relative to first central longitudinal axis 87 from second passage 79 into annular passage 78 to impinge against side wall 72 of outer conduit 19. Side wall 86 of inner conduit 21 extends through larger openings 58 formed in first and second intermediate plates 52, 54 and opening 64 formed in wool filter 16.

Silencer 22 is configured to attenuate sound energy generated by engine 11 during the combustion process. Silencer 22 includes a sleeve 92 mounted to housing side wall 24 in housing outlet 34 and formed to include a third passage 94, a conduit 96 positioned to lie in third passage 94 in coaxial relation to sleeve 92 relative to a second central longitudinal axis 98, and sound-absorbent material 100 positioned to lie in a space 110 formed between sleeve 92 and conduit 96. Central longitudinal axes 87, 98 are positioned to lie generally perpendicular to one another.

Conduit 96 is formed to include a field of openings 112 that communicate with space 110 to maximize sound attenuation. Conduit 96 includes an inlet 114 through which combustion product flows from outlet chamber 46 into third passage 94 and an outlet 116 through which combustion product is dispensed from exhaust processor 10.

Combustion product including possible unburned carbon particles enters exhaust processor 10 through inlet conduit 33. It then flows through second passage 79 and radially outwardly relative to axis 87 through openings 23 into annular passage 78 so that unburned carbon particles impinge against side wall 72 of outer conduit 19 to reduce the ignition potential of the unburned carbon particles. Combustion product makes a first generally 180° turn as it flows from second passage 79 to annular passage 78.

After impingement of unburned carbon particles against side wall 72, combustion product flows through annular passage 78 and outlet 74 into inlet chamber 42 where it makes a second generally 180° turn. It then flows in sequence from inlet chamber 42 through openings 60 formed in first intermediate plate 52, wool filter 16, and openings 60 formed in second intermediate plate 54 to intermediate chamber 44. Wool filter 16 filters unburned carbon particles from combustion product as the combustion product flows therethrough.

Combustion product then flows from intermediate chamber 44 through openings 60 formed in right partition 38 to outlet chamber 46. In outlet chamber 46, combustion product first makes a generally 90° turn and then a third generally 180° turn into third passage 94 of silencer 22. Combustion product flows through silencer 22 where sound energy is attenuated and then exits exhaust processor 10.

Although the invention has been described in detail with reference to preferred embodiments, variations and modifications exist within the scope and spirit of the invention as defined and defined in the following claims.

What is claimed is:

1. An exhaust processor for processing combustion product comprising a housing formed to include an interior region and formed to include a housing inlet through which combustion product enters the interior region and a housing outlet through which combustion product exits the interior region, a partition including a first plate formed to include a first opening, a second plate formed to include a second opening and cooperating with the first plate to form a space therebetween, and wool positioned to lie in the space between the first and second plates, the first and second plates cooperating to partition the interior region into a first chamber and a second chamber, the wool being configured to filter unburned carbon particles entrained in combustion product flowing from the first chamber through the first opening, the wool, and the second opening to the second chamber so that the partition operates as a first spark arrester, the first and second plates and the wool cooperating with one another to form a third opening, and a second spark arrester including an outer conduit extending through the third opening and formed to include a first passage and an outlet and an inner conduit positioned to lie in the first passage and formed to include a second passage and a fourth opening so that unburned carbon particles entrained in combustion product flows from the second passage through the fourth opening to impinge against the outer conduit, the outer conduit being arranged to dispense combustion product through its outlet into the first chamber without introducing combustion product directly from the first passage into the space between the first and second plates.

2. The exhaust processor of claim 1, wherein the wool surrounds the outer conduit and contacts the outer conduit and the first and second plates.

3. The exhaust processor of claim 1, wherein the wool surrounds and is spaced apart from the inner conduit.

4. The exhaust processor of claim 1, wherein the first and second plates and the wool contact the housing.

5. The exhaust processor of claim 4, wherein each of the first and second plates and the wool includes a generally oval-shaped edge that contacts the housing.

6. The exhaust processor of claim 1, wherein the outer conduit is mounted to the first and second plates and contacts the wool and the inner conduit is spaced apart from the first and second plates and the wool.

7. The exhaust processor of claim 1, wherein the wool includes a pad of stainless steel wool.

8. The exhaust processor of claim 1, wherein the second spark arrester further includes a closure cap, the inner conduit includes an end positioned to lie in the first passage, and the closure cap is coupled to the end of the inner conduit to close the end of the inner conduit.

9. The exhaust processor of claim 1, wherein the second spark arrester further includes a closure cap, the outer conduit is cylinder-shaped and includes a first end that defines the outlet of the outer conduit, a second end that is closed by the second closure cap, and a side wall extending from the first end through the third opening to the second end.

10. The exhaust processor of claim 9, wherein the side wall of the outer conduit is formed without any openings.

11. The exhaust processor of claim 1, wherein the width of the space between the first and second plates defines a first distance and the partition is spaced from the outlet of the outer conduit by a second distance which is least eight times the first distance.

12. An exhaust processor for processing combustion product comprising a housing formed to include an interior region and a housing inlet through which combustion product enters the interior region, the housing including a side wall formed to include a housing outlet through which combustion product exits the interior region, a first partition, a second partition cooperating with the first partition to partition the interior region into an inlet chamber, an intermediate chamber formed between the first and second partitions, and an outlet chamber, the second partition being configured to filter unburned carbon particles from combustion product flowing from the inlet chamber through the second partition to the intermediate chamber so that the second partition operates as a first spark arrester, the second partition being formed to include a first opening, a second spark arrester including an outer conduit extending from the inlet chamber through the first opening to the intermediate chamber and formed to include a first passage and an inner conduit positioned to lie in the first passage in coaxial relation to the outer conduit relative to a first axis, the outer conduit being mounted to the first and second partitions, the inner conduit being formed to include a second opening so that unburned carbon particles entrained in combustion product flows from the second passage through the second opening to impinge against the outer conduit, and a silencer including sound-absorbent material, a sleeve formed to include a third passage, and a conduit positioned to lie in the third passage in coaxial relation to the sleeve relative to a second axis, the sleeve and the conduit of the silencer cooperating to form a space therebetween, the sound-absorbent material being positioned to lie in the space, the sound-absorbent material, the sleeve, and the conduit of the silencer extending from the outlet chamber through the housing outlet so that combustion product flows from the outlet chamber through the silencer to exit the exhaust processor, the first and second axes being positioned to lie in generally perpendicular relation to one another.

13. The exhaust processor of claim 12, wherein the second partition includes a filter and a filter positioner coupled to the housing and the outer conduit and configured to position the filter between the inlet and intermediate chambers.

14. The exhaust processor of claim 13, wherein the filter and the filter positioner cooperate to form the first opening and surround the outer conduit.

15. The exhaust processor of claim 13, wherein the filter positioner includes first and second plates that are coupled to the outer conduit and contact the filter to position the filter in a space formed between the first and second plates.

16. The exhaust processor of claim 15, wherein the outer conduit is formed to include an outlet so that the outer conduit is configured to dispense combustion product through the outlet into the inlet chamber without introducing combustion product directly into the space formed between the first and second plates.

17. The exhaust processor of claim 13, wherein the filter includes a pad of wool that contacts the filter positioner and the outer conduit and is spaced apart from the inner conduit.

18. The exhaust processor of claim 12, wherein the inner conduit includes a first end positioned to lie in the first passage, a second end positioned to lie outside of the first passage, and a side wall that extends first and second ends of the inner conduit and is formed to include the second opening and the second spark arrester further includes a closure cap coupled to the first end to close the first end to cause combustion product to make a first generally 180° turn as it flows from the second passage through the second opening to an outlet of the outer conduit.

19. The exhaust processor of claim 18, wherein the outer conduit includes a first end that is positioned to lie in the inlet chamber and forms the outlet of the outer conduit, a second end mounted to the first partition, and a side wall extending between the first and second ends of the outer conduit and the second partition is coupled to the side wall of the outer conduit so that combustion product makes a second generally 180° turn as it flows from the outlet of the outer conduit through the inlet chamber to the second partition.

20. The exhaust processor of claim 19, wherein the first partition is perforated and the silencer includes an inlet so that combustion product makes a generally 90° turn and then a third generally 180° turn as it flows from the first partition through outlet chamber into the inlet of the silencer.

* * * * *